Figure 1:
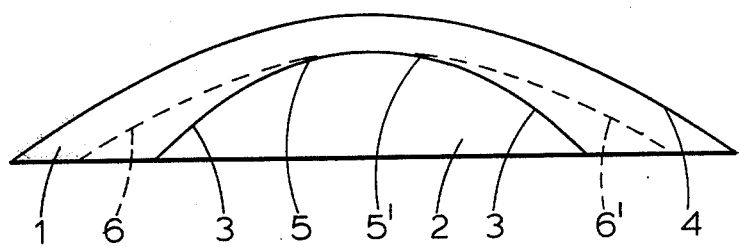

United States Patent [19]

Howden

[11] 4,319,945
[45] Mar. 16, 1982

[54] METHOD OF PRODUCING ASPHERICAL OPTICAL ELEMENTS

[75] Inventor: Harry Howden, Smallfield, England

[73] Assignee: U.S. Philips Corporation, New York, N.Y.

[21] Appl. No.: 103,681

[22] Filed: Dec. 14, 1979

[30] Foreign Application Priority Data

Dec. 28, 1978 [GB] United Kingdom ............... 50127/78
May 16, 1979 [GB] United Kingdom ............... 16961/79

[51] Int. Cl.³ .......................... G02B 3/04; G02B 1/10
[52] U.S. Cl. ..................................... 156/212; 264/1.7; 427/165; 427/169
[58] Field of Search ................. 350/189; 427/165, 169; 264/1, 1.7; 156/212

[56] References Cited

U.S. PATENT DOCUMENTS 3,873,191 3/1975 Veret et al. .......................... 350/293
3,876,734 4/1975 Howden ................................... 264/1
3,920,327 11/1975 Howden ................................... 264/1
3,980,399 9/1976 Howden ............................... 350/293

FOREIGN PATENT DOCUMENTS 1301551 12/1972 United Kingdom .
1308173 2/1973 United Kingdom .

Primary Examiner—James R. Hoffman
Attorney, Agent, or Firm—Paul R. Miller

[57] ABSTRACT

A method of producing an aspherical optical element involves first forming a glass substrate with at least part of one surface having an irregular surface finish and an aspherical profile having a second order accuracy, which can be obtained by automatic tooling methods, and thereafter forming a polymeric material on such surface so as to form a surface making up differences between the aspherical parts of the substrate and a predetermined, desired aspherical profile, i.e. one of the first order of accuracy which can be obtained only by detailed and skilled hand work.

9 Claims, 2 Drawing Figures

METHOD OF PRODUCING ASPHERICAL OPTICAL ELEMENTS

This invention relates to a method of producing aspherical optical elements which comprise a light transmissive glass substrate with a coating of a light transmissive polymeric material thereon.

It is well known in the art that optical designers have long been inhibited in specifying optical designs which incorporate aspherical optical elements because of difficulties in producing large numbers of accurately profiled, optically polished, aspherical elements. Methods of producing high quality optical elements in large quantity production have hitherto been restricted to either the production of glass optical elements with spherical surfaces or to composite optical elements comprising glass substrates coated with a resinous material in which the glass substrate has a flat or a spherical surface form.

From United Kingdom Pat. No. 1,308,173 it is known to produce optical elements with a required shape by a process in which a surface approximating to the required shape is provided, and forming thereon an optical surface of the required shape by causing a layer of hardenable resin, moulded by a matrix having a shape complementary to the required shape, to adhere to the support surface, a metallic, anti-adhesive coating being first provided on the matrix surface so that when the resin layer hardens it does not adhere to the matrix surface. The surface of the support in approximating to the required shape is as geometrically simple as possible, for example, a plane, a cone, cylinder, sphere or a pyramid. Non simple geometrical shapes, such as, aspheres, or accurate deviations from spheres, which are required for the production of aspherical, aberration free, correcting lenses are not considered in the aforesaid patent except by a reference that such non simple shapes, such as, aspherical surfaces must be obtained by local retouching of a ground plane or a spherical surface and that this operation is lengthy and expensive, produces uncertain results and is not suitable for small or large scale production. The optical surfaces of their required shapes are produced solely by the layer of hardenable resin and is complementary to the surface of the matrix before differential shrinkage of the hardenable resin occurs and also, in the case of lens elements, before removal of the layer of the metallic anti-adhesive coating. This layer furthermore may not be applied as an uniformly thin coating and the removal thereof will therefore affect both the profile of the final surface and the thickness of the final resin layer so produced.

Aspherical optical lens elements which comprise a flat or a spherical light transmissive glass substrate with a layer, the outer surface of which is aspheric, of a light transmissive thermosetting resin thereon, are known from United Kingdom Pat. No. 1,301,551. In U.K. Pat. No. 1,301,551 the glass substrate is pre-prepared by being machined, ground and polished to a convenient flat or spherical form and an accurately made, hand finished, mould tool with a moulding surface having a negative profile in cross-section of a desired aspheric profile, is used in a moulding process to mould a layer of the thermosetting plastics material thereon so that the outer surface has the desired aspherical form.

The difference in form between the pre-prepared profile of the spherical or flat glass, substrate and the hand finished negative aspherical profile of the moulding surface of the mould tool is taken up by variations in the thickness of the thermosetting resin.

Aspherical optical elements of the aforesaid kind are subject to a number of disadvantages. The optical elements have the whole of their asphericity accommodated by the coating of the thermosetting resin. Consequently, the resin layer is again comparatively thick. In the case of an aspherical optical element with a steeply profiled aspherical form this thickness may amount to several millimeters. The applicant has found that it is particularly advantageous to have an aspherical optical element with a thin coating, as hereinafter described, of a light transmissive material the outer surface of which is aspheric and that to achieve this a preformed substrate can be prepared by quantity production techniques, in which part of the required asphericity is contained within the surface of the preformed substrate. Furthermore, applicant has found that optical elements which have the whole of their asphericity accommodated by the thick coatings require, in general, a correspondingly thick substrate in order to reduce the effect of distortion due to bonding dissimilar materials to each other.

Distortion of the thick coating and or substrate, for example, will prevent the effective use of such optical elements. The adverse effect of distortion is greatest over wide temperature changes and distortion may occur during the temperature changes produced during manufacture, for example, while hardening the resin, as well as during the use of the finished product.

Differential shrinkage of a comparatively thick, non uniform resin coating on curing also causes a loss in optical efficiency unless the thickness and therefore the shrinkage can be made uniform and as a consequence can be compensated for. Optical elements of the present invention can have a uniform layer of resin over at least a part of the substrate surface, the amount of the non uniformly applied layer being dependent upon the difference between the remaining part of the profile substrate and that of the desired profile. A further disadvantage of the aforesaid known thick layered optical elements is that shrinkage of the thick resin coating on hardening can cause considerable forces to be exerted on the substrate which may cause the surface of the substrate to fracture. These disadvantages have previously limited the range of useful light transmissive resins to thermosetting resins. Thermosetting resins of thicknesses of several millimeters thick, have the further disadvantage in that they require a low temperature cure and a long cure time to minimise the aforesaid effects of distortion.

Relatively thick coatings of this type therefore do not lend themselves to the production of optical elements on a large scale production run.

One object of the present invention is to provide an improved method of producing an aspherical optical element which mitigates the aforesaid disadvantages.

Another object of the invention is to provide a method by which a wider range of light transmissive materials, for example of thermosetting resins and/or thermoplastic resins, can be used as a coating material.

A still further object of the invention is to provide a method by which aspheric optical elements can be manufactured cheaply by mass production methods and wherein the optical elements are consistent in quality of both the surface finish and the profile form.

According to the present invention there is provided a method of producing an aspherical optical element comprising a light transmissive glass substrate with a coating of a light transmissive polymeric material thereon, characterised in that the glass substrate is formed in a first process phase with at least one part of the surface having an irregular surface finish and an aspherical profile having a second order of accuracy when compared with the profile of a desired aspherical profile and in that the polymeric material is bonded to the surface of the substrate in a second process phase, the polymeric material having a differential thickness which is just sufficient to accommodate the difference between the aspherical profile part of the glass substrate and the desired asphericity and to provide an overall coating with an optical surface finish to the irregular glass surface, wherein the glass substrate is supported in a mould tool with the part aspherical surface of the glass substrate in close proximity to the moulding surface of the mould tool, the moulding surface having a negative profile of the desired aspherical profile processed to a first order of accuracy and having a smooth, optically polished surface finish, filling the region between the two surfaces with the polymeric material, bonding the material to the surface of the glass substrate while moulding the polymeric material to form the desired aspherical profile and surface finish followed by releasing the optical element from the moulding tool.

The expression for the light transmissive glass substrate having, "at least one part an aspherical profile having a second order of accuracy when compared with the profile of a desired aspherical profile "is understood to mean that, if the profile of the desired aspherical optical element is produced from a master moulding surface of a mould tool and the mould surface is produced to a first order of accuracy by the aforesaid lengthy and expensive techniques involving the classical "cut and try" grinding and polishing methods of hand figuring, the results being expressed in sodium fringes of light, then the overall profile of the glass substrate is complementary to and follows the required profile in its shape for a part of the required profile and deviates substantially from that part for the remainder of the required profile. Thus, the profile of the glass substrate has a shape, which in any direction taken along the surface for the aforesaid part, is parallel to the required profile; and the polymeric coating for that part therefore has a coating of a substantially uniform thickness. The remaining part of the coating on the glass substrate has a thickness which uniformly varies to the maximum thickness of the polymeric coating. The first order accuracy produced by the aforesaid hand figuring method for the profile of the mould tool may be accurate to 2 fringes or less of sodium light per inch. A replicated polymeric coating produced from such a mould surface may also be within to 2 fringes or less sodium light accuracy of the required profile. The second order of accuracy profile of the glass substrate produced by the most suitable mass production machine tools may have furthermore a profile tolerance defect band of ±200 microns; the glass substrate not being capable of greater profile accuracy to the required profile by normal working, quantity production methods.

The expression, "having an irregular surface finish" means that the surface of the glass substrate is not finely polished by hand polishing or figuring to an optical finish. However, the "irregular surface finish" may be of high quantity formed as the result of producing the profiled surface by carefully controlled large scale production techniques, such as, machining, pressing, fine grinding or moulding.

The manufacturing time for the aforesaid elements when compared with the known thick film optical elements is reduced and the finished product is not as subject to the distortion effects referred above or to as great stress forces as is produced by the known thicker coatings which contain the whole of the aspherical profile within the thickness of the resin coat.

The optical elements of the invention may be used without loss of optical efficiency over a wide range of temperatures from, for example, $-50°$ C. to $+100°$ C.

The aspherical optical element of the invention may be provided by preparing the glass substrate with a profile which follows at least in part, the profile of the desired aspherical profile so that the glass substrate is capable of being coated with a minimum thickness of the polymeric material at the part and with a maximum thickness of polymeric material at the remaining part or parts of the glass substrate and wherein the polymeric coating increases uniformly from the minimum thickness to the maximum thickness.

In one embodiment of the method the aspherical surface of the glass substrate is supported in the mould tool at a distance of less than 100 $\mu$m from the negative aspherical surface of the mould tool at the closest distance and of not more than 450 $\mu$m as the farthest distance from the negative aspherical surface of the mould.

The profile of the glass substrate may have the substantially aspherical part of the surface with the second order of accuracy due to the limitations of the manufacturing process restricted to that part as well as the remaining non aspherical substrate part. The surface of the substrate may suitably be formed by being previously machined and/or cast to the approximately accurate form. This surface may be irregular and not smooth and thus may be roughly polished. The profile will still have a series of irregularities which can vary by ±200 $\mu$m of the substrate profile.

After positioning the substrate in the mould tool the region between the two surfaces may be filled with a polymeric material in a liquid form and the polymeric material is bonded to the surface of the substrate by causing the material to harden. When the polymeric material is hardened the optical element is released from the mould by the application of a lateral separating force.

A release agent may be used on the surface of the mould tool such as a mono molecular layer of an inert, transparent liquid comprising a paraffin or a silicone oil in order to ensure easy release on hardening of the polymeric material. Alternatively, an inert solid layer of for example, amorphous carbon or an inert metal may be deposited on the surface of mould tool to assist separation on hardening the polymeric material.

In an alternative embodiment of the method the region between the two surfaces is filled with a mouldable, solid polymeric material, for example, in foil form, and the polymeric material is bonded to the surface of the substrate by the application of heat and pressure. The substrate may in this case be brought to the desired position wherein the closest point is a distance of less than 100 $\mu$m and at the farthest point is a distance of not more than 450 $\mu$m from the negative aspherical surface by deforming the mouldable, solid polymeric material. On deforming the solid polymeric material it becomes bonded to the finely machined or ground surface of the substrate in preference to the polished surface of the mould tool which polished surface may also be treated with a release agent or have a parting layer of metal or carbon layer coated thereon and which remains substantially on the surface of the mould tool.

As indicated above the substrate with a profile of a second order of accuracy can be produced by automatic methods by casting, machining or groundinng a surface so that it closely approximates the desired aspherical profile and containing at least a part of the desired asphere in its surface. The profile of the moulding surface of the mould tool however is an accurately prepared negative of the desired aspherical profile surface and it has an optical surface finish which is commonly produced by skilled workers using traditional cut and try polishing techniques as for example, used in the hand figuring of paraboloids for use in astronomy. The automatic methods of producing the surface profile on the substrate is subject to certain defects for optical purposes both in the order of accuracy of the aspherical profile produced and in the irregularities of the surface finish. It has been found that these defects can not be completely eliminated even when the cutting, grinding and/or finely polishing tools are carefully controlled by a cam or a programmed controlling device, such as, a programmed punched tape or by machining with a programmed machine single point cutting tool, such as a carbide, nitride or a diamond cutting tool, at an elevated temperature close to the softening point of a substrate such as glass. With regard to the surface profile of the substrate a tolerance defect band of 400 $\mu$m or $\pm 200$ $\mu$m of a programmed profile is usual. It is therefore convenient in large quantity production to produce a substrate with only a part of the surface to within the aforesaid tolerance defect band limits.

In a further embodiment the glass substrate is cast, or machined and ground, to a surface profile which at least in part has a profile irregular surface finish which varies between $\pm 200$ $\mu$m of the desired aspherical surface profile part.

The region between the surface of the substrate and the surface of the negative aspherical profile of the moulding tool should not be less than 2 to 3 $\mu$m as direct contact between the two surfaces is to be avoided when the aspherical part of the glass substrate is placed in close proximity to the moulding surface of the mould tool.

Conveniently the region between the two surfaces is such that the polymeric material filling the region has a thickness which is less than 100 and more than 2.0 $\mu$m at the thinnest part prior to hardening the polymeric material.

The polymeric materials which may be used as the light transmissive polymeric material is dependent upon the durability and optical performance of the resultant optical element. A wide range of transparent thermoplastics and thermosetting materials are suitable. Transparent thermoplastics and thermosetting materials, such as epoxy resins, polyesters, polyamides, polycarbonates and acrylics are particularly suitable.

The thermosetting resins may be cured from a liquid state to form a solid transparent polymeric coating which resin in the cured state has good adhesion to the glass substrate, good mechanical properties, poor adhesion to the treated or untreated mould tool surface, a low thermal expansion coefficient and a good resistance to water. The resins selected should also have a good resistance to deterioration on exposure to ultra violet light radiations and a good reproducibility of their refractive index properties. Fillers, diluting agents and extenders may be used in the resins but preferably such additives should be kept below 10% by weight.

Suitable thermoplastics resins and thermosetting resins when used in the solid form must be capable of being moulded to take up the difference in shape between the negative profile of the mould tool and the substrate during manufacture. Solid thermoplastics or thermosetting materials are preferably used in the form of a foil of thickness at least equal to the maximum thickness required.

Figure 2:
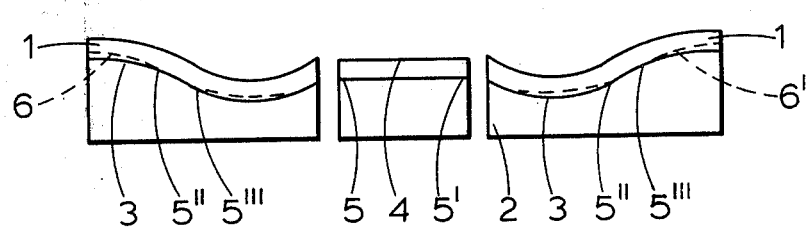

Embodiments of the invention will now be described by way of example, in which:

FIG. 1 illustrates an enlarged cross-sectional view which is not drawn to scale of an aspherical optical element when prepared by the method according to the invention; and FIG. 2 illustrates in three parts a cross-sectional view, not drawn to scale, of an alternative embodiment of an optical element when prepared by the method according to the present invention.

A polymeric coating 1 is bonded to the surface of a glass substrate 2. The glass substrate 2 was formed in a first process phase by conventional, cheap production techniques by machining, fine grinding, turning and/or milling a glass blank until it has a surface with a profile 3.

The surface of profile 3 has a shape which approximates to a second order of accuracy and is as close as it is possible to achieve by the conventional production techniques, to the required aspheric shape of profile 4. The profile 3 made by these methods was sufficiently accurate to follow the required profile 4 over a part of its surface as indicated by 5,5' within the undermentioned limits. The profile 3 deviates from the required profile 4 over the remaining part of its surface as indicated by the broken line 6,6'. As the surface of profile 3 was produced by conventional production techniques the surface has limiting irregularities in its surface profile. These irregularities are critical and are normally within the range of $\pm 200$ $\mu$m of the indicated profile 3 even when the great of care is taken, for example, when using automatically controlled and programmed milling and polishing machine.

The reference numerals of FIG. 2 indicate similar features to the reference numerals of FIG. 1 with the exception that the profile 3 of substrate 2 differs from the required profile 4 at the additional points 5" and 5''' in the cross-section shown.

An aspherical optical element in the form of a Schmidt corrector plate (FIG. 2) was prepared in accordance with the method of the invention.

A glass substrate (2) was produced in a first moulding phase by a well known, mass production technique for producing glass mouldings. The glass of the glass substrate (2) was of the type known as MBC 572 577 (Chance Pilkington Optical Glass catalogue). An aspherical profile (3) of the glass substrate (2) was produced with a second order of accuracy when compared with the desired aspherical profile. In an alternative method of the invention the glass substrate was first produced by moulding and the aspherical profile (3) was produced by machining and/or grinding. One profile of the substrate (2) is indicated (FIG. 2) as being flat and for the purposes of the present example only profile (3) is considered. It was found that the profile (3) of the glass substrate (2) at the end of the first process phase was within 100 $\mu$m of the desired aspherical profile. The surface finish of the glass substrate was dependent upon whether or not it was subjected to a machining and/or a grinding process.

The glass substrate was introduced into a mould tool having a moulding surface with an accurately prepared negative profile of the desired aspherical profile. The accurately prepared negative profile was prepared by hand figuring and polishing the moulding surface of the mould tool to a surface profile accuracy measured to within 2 μm of the desired profile. The glass substrate after the surface of the substrate was chemically cleaned and treated with a bond promoting agent, was then carefully positioned in the mould tool so that its aspherical profile was at a minimum distance of 300 μm from the moulding surface of the mould tool. The surface of the mould tool was previously treated with a suitable mould release agent. A polymeric material comprising an epoxy resin in liquid form was then introduced between the aspherical surface of the glass substrate and the negative aspherical surface of the mould tool. The resin was allowed to harden so that the glass substrate was coated with a thin layer of resin. The resin coated glass substrate was then released from the mould tool. A disc shaped aspherical optical element was then formed which had an optical aperture of 126 mm diameter and a profile with a maximum asphericity of 0.713 mm at the surface of the resin. The overall surface accuracy of the aspherical profile of the thin layer of resin on the glass substrate was 3.0 μm when compared with the desired aspherical profile. The resin used for coating the glass substrate was a bisphenol A epoxy resin. This resin when cured has good optical properties, a low coefficient of thermal expansion and good adhesion and abrasive resistance. Due to the relatively thin layer of the resin on the glass substrate. The optical element was found in use to have good dimensional stability and good optical properties over a wide range of temperatures, which temperatures range from $-30°$ C. to $70°$ C. The calculated coordinates of the desired aspherical profile of the optical element for one optical application are as follows:

| R  | Z     | R  | Z        | R  | Z     | R  | Z        |
|----|-------|----|----------|----|-------|----|----------|
| 0  | 0.0 mm| 11 | 0.171 mm | 21 | 0.559 | 31 | 0.657 mm |
| 2  | 0.002 | 12 | 0.204    | 22 | 0.596 | 32 | 0.612    |
| 3  | 0.004 | 13 | 0.240    | 23 | 0.629 |    |          |
| 4  | 0.007 | 14 | 0.279    | 24 | 0.656 |    |          |
| 5  | 0.029 | 15 | 0.317    | 25 | 0.682 |    |          |
| 6  | 0.044 | 16 | 0.357    | 26 | 0.703 |    |          |
| 7  | 0.064 | 17 | 0.398    | 27 | 0.712 |    |          |
| 8  | 0.086 | 18 | 0.440    | 28 | 0.713 |    |          |
| 9  | 0.111 | 19 | 0.481    | 29 | 0.706 |    |          |
| 10 | 0.140 | 20 | 0.521    | 30 | 0.688 |    |          | where R is the radial distance in mm from the optical axis of the disc and Z is the height in mm, calculated as a departure from a radial line at a right angle to the optical axis and tangential to the appropriate aspherical curve.

A lens of 140 mm diameter ×0.7 mm asphericity was prepared using a glass substrate with a measured accuracy for the profile of 140 μm.

The thickness of a layer of polymeric coating was 60 μm minimum and 200 μm maximum with a uniform change of thickness between the minimum to the maximum thickness. The polymeric coating comprised an epoxide resin (MY750) which when hardened had a linear thermal coefficient of expansion of $50 \times 10^{-6°}$ C. The thermal linear coefficient of expansion of the glass substrate (Glass Code MC.572577) as $70 \times 10^{-7°}$ C. As the thermal linear coefficient of expansion of the glass is very low it can be ignored for the purpose of measuring the axial distortion produced with changes in temperature, for example (a) the axial distortion of the 140 μm thick polymeric layer (MY750) between the required working temperature limits of $-50°$ to $+80°$ C. is 140 μm×130° C.×50×10$^{-6}$=0.9 μm=1.5 sodium wavelength.

(b) when an acrylic layer with a linear thermal coefficient of expansion of $8 \times 10^{-5°}$ C. was used in place of the aforesaid epoxide layer an axial distortion over the same temperature range of $-50°$ C. to $+80°$ C. is 140 μm×130° C.×8×10$^{-5°}$ C. = 1.4 μm=2.4 sodium wavelengths.

These results show that axial distortion over a wide temperature range is very small for thin polymeric coated/glass substrate aspheric optical elements when compared with known aspheric optical elements.

I claim:

1. A method of producing an aspherical optical element comprising the steps of
    forming a glass substrate with at least part of one surface having an irregular surface finish and an aspherical profile having a surface accuracy with a surface irregularity varying within limits of +200 μm when compared to a desired aspherical profile, and
    bonding a polymeric material to said one surface of said substrate, said polymeric material having a differential thickness sufficient to accommodate differences between the aspherical profile portion of said substrate and said desired aspherical profile, said polymeric material providing an overall optical surface finish to said irregular surface finish of said glass substrate,
    said bonding step being carried out by the steps of
    supporting said glass substrate in a moulding tool with said aspherical profile of said glass substrate being in close proximity to a moulding surface of said moulding tool, said moulding surface having a negative profile of said desired aspherical profile in an accuracy to within two fringes or less of sodium light per inch, and said moulding surface having a smooth optically finished surface finish,
    filling regions between said glass substrate and said moulding surface with said polymeric material,
    bonding said polymeric material to said one surface of said glass substrate,
    moulding said polymeric material to a surface finish of said desired aspherical profile, and
    releasing an aspherical optical element of said glass substrate and polymeric material from said moulding tool.

2. A method according to claim 1, wherein said glass substrate is supported in said moulding tool with the aspherical surface of said substrate being at a minimum distance of under 100 μm and at a maximum distance of not more than 500 μm from said moulding surface of said moulding tool.

3. A method according to one of claim 1 or claim 2, wherein said step of filling is carried out by providing said polymeric material in liquid form, and said step of bonding is carried out by hardening said polymeric material.

4. A method according to claim 3, wherein said polymeric material in liquid form is an epoxy resin.

5. A method according to one of claim 1 or claim 2, wherein said step of filling is carried out by inserting a solid mouldable polymeric material foil between said glass substrate and said moulding surface, and said step of bonding is carried out by heating and applying pressure.

6. A method according to claim 5, wherein said mouldable polymeric material is a thermoplastic foil of thickness greater than 100 μm, and said step of moulding is carried out by deforming said polymeric material foil to fill all spaces between said glass substrate and said moulding surface.

7. A method according to one of claim 1 or claim 2, wherein said glass substrate is formed by casting or by machining and grinding said one surface.

8. A method according to one of claim 1 or claim 2, wherein said polymeric material has a maximum thickness of less than 450 μm.

9. A method according to one of claim 1 or claim 2, wherein said one surface of said glass substrate matches said desired aspherical profile at least in part so that said glass substrate is coated with a minimum thickness of said polymeric material at said part and with a maximum thickness of said polymeric material at remaining portions of said glass substrate, said polymeric material uniformly increasing in thickness from said minimum thickness to said maximum thickness.

* * * * *

UNITED STATES PATENT AND TRADEMARK OFFICE
CERTIFICATE OF CORRECTION

PATENT NO. : 4,319,945
DATED : March 16, 1982
INVENTOR(S) : HARRY HOWDEN

It is certified that error appears in the above—identified patent and that said Letters Patent is hereby corrected as shown below:

Column 8, Line 26, Claim 1, change "+200" to -- $\pm 200$ --.

Signed and Sealed this

Twenty-seventh Day of July 1982

[SEAL]

Attest:

*Attesting Officer*

GERALD J. MOSSINGHOFF

*Commissioner of Patents and Trademarks*